Aug. 16, 1955
L. MAKOUS
2,715,687
TEMPERATURE RESPONSIVE VOLUME COMPENSATOR
FOR SUBMERSIBLE MOTORS
Filed Dec. 18, 1953
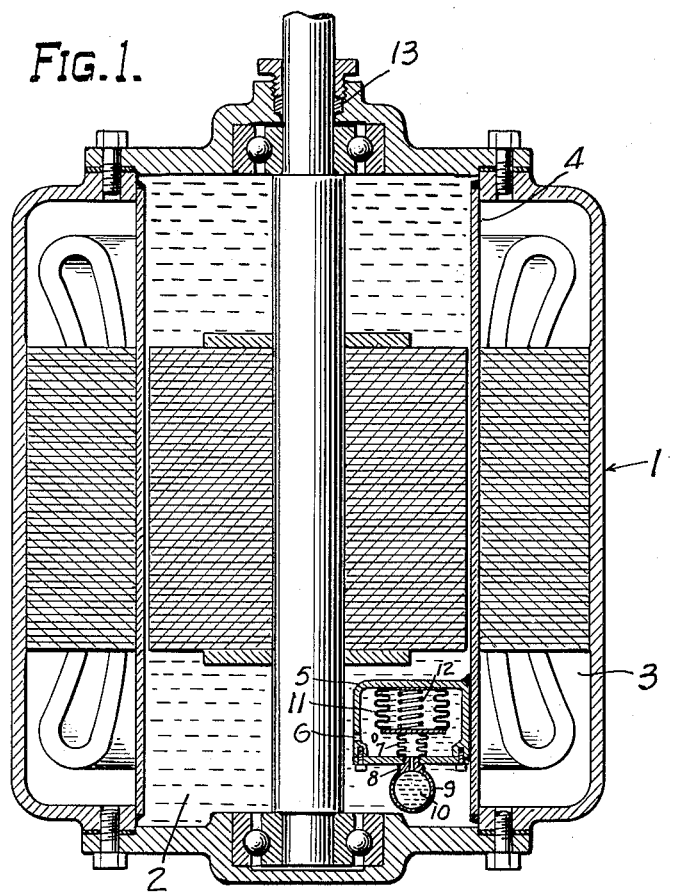
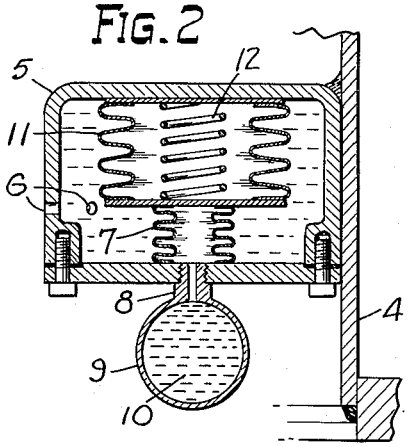
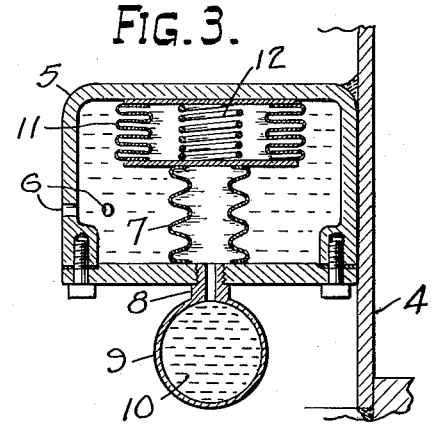
INVENTOR.
Lawrence Makous
BY
Andrus & Sceales
ATTORNEYS.

United States Patent Office 2,715,687
Patented Aug. 16, 1955

2,715,687

TEMPERATURE RESPONSIVE VOLUME COMPENSATOR FOR SUBMERSIBLE MOTORS

Lawrence Makous, Milwaukee, Wis., assignor to A. O. Smith Corporation, Milwaukee, Wis., a corporation of New York Application December 18, 1953, Serial No. 399,090

4 Claims. (Cl. 310—87)

This invention relates to a volume compensating apparatus for a confined liquid that is subject to changes in temperature, and more particularly for liquids confined within a submersible motor.

A submersible motor is frequently filled with a liquid to protect the windings and lubricate the bearings and the like, as well as to prevent the entrance of the liquid surrounding the motor which generally contains foreign matter injurious to the motor.

Operation of submersible motors is normally of an intermittent character with a consequent alternate heating and cooling of the liquid within the motor. As the liquid is heated, it expands and tends to escape past the shaft seals. When the liquid cools, it contracts with a resultant void within the motor. The surrounding liquid tends to enter the motor, fill the void, and carry undesirable foreign matter into the motor. Eventually the expansion and contraction of the liquid within the motor effects replacement of the original liquid with the surrounding liquid.

In the past to overcome these difficulties, expensive and complicated seals have been employed, either with or without an expansible member. The expansible member is acted on directly by the liquid within the motor to maintain a constant pressure on the shaft seals by the confined liquid.

According to the present invention, a thermal responsive unit is employed to act on an expansible member and to thereby provide quick volume compensation for changes in the temperature of the liquid within the motor and to maintain the pressure of the liquid at a constant value.

More specifically, in accordance with the present invention, a small flexible member is filled with a high expansive rate liquid. The small member acts on a larger flexible member to change the volume of the latter. The assembly is disposed within the chamber containing the confined liquid and quickly responds to changes of the liquid volume arising from changes in temperature. The invention provides an inexpensive means of preventing the replacement of a confined liquid with a contaminated liquid.

The drawing furnished herewith illustrates the best mode presently contemplated of carrying out the invention as set forth hereinafter.

In the drawing:

Figure 1 is a cross-sectional view of the invention applied to a submersible motor;

Fig. 2 is an enlarged detail view of the invention with the expansible members in the position obtained when the motor fluid is cool; and Fig. 3 is an enlarged detail view showing the expansible members of the invention with the larger members in compressed position when the motor fluid is heated.

Referring to the drawing there is shown a submersible motor 1 separated into a rotor compartment 2 and a stator compartment 3 by a liner 4. The rotor compartment is filled with liquid such as oil or water. As shown in the drawings for purposes of illustration only a generally small metal box or housing 5 of generally rectangular shape and having a hollow chamber therein is secured to liner 4 by welds or the like and is disposed in the liquid filled rotor compartment 3. Perforations 6 in housing 5 provide for flow of liquid between the rotor compartment and the chamber of box 5.

A bellows 7 which is closed at one end is located at one side of the chamber of box 5 in engagement with a wall of box 5. A tube 8 extends through the wall of the box from that end of bellows 7 resting against the box wall and connects the bellows to a relatively large bulb 9 which is submerged in the liquid in rotor compartment 3. Bellows 7, tube 8 and bulb 9 are filled with a high expansive rate liquid 10 such as alcohol, mercury and the like. The expansion and contraction rate of liquid 10 upon heating and cooling, respectively, is substantially greater than that for the liquid in compartment 2.

A second bellows 11 of much larger diameter than bellows 7 is located between bellows 7 and the opposite wall of box 5 with one end of belows 11 being secured to the wall of box 5 and closed thereby and the other end of bellows 11 being closed and disposed in engagement with bellows 7.

A coil spring 12 is centrally located within bellows 11 and extends from the end thereof in engagement with bellows 7 to the wall of box 5 which closes the other end of bellows 11. The spring normally tends to expand bellows 11 against bellows 7.

The operation of the invention, as described above, is explained as follows:

Assume the motor 1 is lowered into a well and starts to operate. Electrical and frictional losses in the motor heats the liquid in rotor compartment 2 with a resultant expansion of the liquid.

The high expansive rate liquid, in bellows 7, tube 8 and bulb 9 is also heated by the electrical and frictional losses and rapidly expands. This action amplifies the small bellows 7. The small bellows 7 thus expands against the force of the spring 12 and compresses the large bellows 11 which increases the volume within the chamber of box 5. The increased volume within box 5 is simultaneously filled by the heated liquid from rotor compartment 2 which flows into box 5 through the perforations 6.

When the motor is shut off, the liquid 2 cools and contracts; simultaneously, the liquid 10 also cools and contracts. Contraction of liquid 10 permits the spring loaded bellows 11 to expand under the force of spring 12 and flow the liquid from box 5 into rotor compartment 2 and fill the void which would otherwise arise from the cooling of the rotor liquid.

With the employment of the invention the liquid with which the motor is initially filled is not subject to pressure changes whereby it would tend to leak through the seals or packing glands 13 upon heating. Nor does the liquid in which motor operates tend to flow into the motor through seals 13 upon cooling of the fluid therein.

The bellows of the invention are replaceable by any other equivalent expansible and contractible means which change the volume of the rotor chamber in response to temperature changes of a high expansive rate fluid. Also the box 5 may be merely a frame or brackets against which the bellows are supported since the box in effect only operates as a mechanical means to support the bellows.

The invention provides a device to change the effective volume of a liquid filled submersible motor to prevent loss of the clean liquid with which the motor is initially filled and replacement thereof by the liquid in which the motor is submerged.

Various modes of carrying out the invention are contemplated as within the scope of the following claims particularly pointing out and distinctly claiming the subject matter which is regarded as the invention.

I claim:

1. In a temperature responsive device for changing the effective volume of a submersible motor to prevent replacement in service through the motor seals of fluid confined in said motor to cool the same, an expansible member located within the motor in contact with the confined fluid with said member being supported against expansion at one end and disposed to expand at the other end, resilient means normally holding said member in expanded position, a second expansible member of a size to displace less volume of fluid than the first named member located within the motor in contact with the confined fluid with said second member being supported against expansion at one end and disposed to expand at the other end in engagement with the expansible end of the first named expansible member, and a fluid in said second named expansible member having an expansion rate upon heating greater than the fluid confined in said motor to compress the first named expansible member by expansion of the second named member through heating of the fluid in the latter by the motor fluid and thereby increase the effective volume of the motor for storage of heated motor fluid and upon cooling of the fluids to decrease the effective volume of said motor for storage of cooled motor fluid.

2. In a temperature responsive device for changing the effective volume of a submersible motor to prevent replacement in service through the motor seals of fluid confined in said motor to cool the same, an expansible member supported in contact with the fluid confined within the motor and being disposed to expand and contract, resilient means normally holding said member in expanded position, a second expansible member supported in engagement with said first named expansible member and of a size to displace less volume of fluid than the first named member, and a fluid in said second named member having an expansion rate upon heating greater than the motor fluid to effect compression of the first named member by expansion of the second member through heating of the fluid in the latter by the motor fluid and thereby increase the effective volume of the motor for storage of heated motor fluid and upon cooling of the fluids to decrease the effective volume of said motor for storage of cooled motor fluid.

3. A thermal responsive device for varying the effective volume of a motor containing a liquid expanding and contracting upon respective heating and cooling arising from intermittent motor operation, comprising a supporting housing secured within said motor and having openings to permit liquid communication between the inside of the housing and the motor, a bellows supported against one side of said housing, a fluid filling said bellows and having a substantially higher rate of expansion and contraction than the liquid in said motor, a second bellows having a greater diameter than the first named bellows supported against the other side of the housing and against one end of said smaller bellows, means normally biasing the larger bellows to an expanded position, and the fluid in said smaller bellows actuating the same to expanded and contracted position upon heating and cooling of the motor fluid to effect expansion and contraction of the larger bellows and respectively reduce the volume of said larger bellows upon heating and increase the volume of said larger bellows upon cooling and thereby vary the effective volume of the motor and prevent leakage of liquid therefrom or inflowing of liquid in which the motor is operating.

4. A thermal responsive device for varying the effective volume of a submersible motor containing a liquid expanding and contracting upon respective heating and cooling, a supporting housing secured within said motor and having openings to permit circulation of the motor liquid therethrough, a bellows supported against one side of the housing and having a tubular extension extending through the housing and exteriorly thereof into the motor liquid, a fluid within said bellows and said tubular extension and having a substantially higher rate of expansion and contraction than the liquid within said motor, and a second bellows having a greater diameter than the first named bellows disposed between the smaller bellows and the other side of said housing, a coil spring provided inside the larger bellows to normally bias the larger bellows to an expanded position, and the fluid in the smaller bellows actuating the said smaller bellows to actuate the larger bellows, the volume of said larger bellows varying inversely with the volume of said smaller bellows to increase and decrease the volume of the motor upon heating and cooling of the liquid therein respectively and thereby prevent leakage of liquid from the motor or inflow of liquid in which the motor is operating.

References Cited in the file of this patent

UNITED STATES PATENTS

| 795,761 | Fulton | July 25, 1905 |
| 2,475,894 | Hermanny | July 12, 1949 |
| 2,492,141 | Gaylord | Dec. 27, 1949 |